United States Patent [19]

Moores, Jr. et al.

[11] Patent Number: 4,550,501
[45] Date of Patent: Nov. 5, 1985

[54] ORBITAL-ACTION RECIPROCATING POWER SAW

[75] Inventors: Robert G. Moores, Jr., Reisterstown, Md.; Daniel H. Sides, New Freedom, Pa.; Howard L. Burnside, Upperco, Md.

[73] Assignee: Black & Decker Inc., Newark, Del.

[21] Appl. No.: 573,199

[22] Filed: Jan. 23, 1984

[51] Int. Cl.⁴ .............................................. B27B 11/02
[52] U.S. Cl. ........................................... 30/393; 74/50
[58] Field of Search ......... 30/272 A, 166 R, 392–394; 74/50; 83/757–759, 769, 776

[56] References Cited

U.S. PATENT DOCUMENTS 1,370,887  3/1921  Giles ................................ 83/758 X
4,238,884  12/1980  Walton ................................ 30/393

*Primary Examiner*—Douglas D. Watts
*Attorney, Agent, or Firm*—Ronald B. Sherer; Harold Weinstein; Edward D. Murphy

[57] ABSTRACT

An orbital-action reciprocating power saw includes a motor-driven transmission that causes a saw blade carrier to reciprocate along an axis of reciprocation and move in a direction transverse to the axis of reciprocation to provide an aggressive cutting action. The transmission includes a rotary-to-reciprocation drive mechanism defined by a rotatably driven gear having an eccentrically mounted pin that engages a slotted yoke connected to the saw blade carrier. The saw blade carrier is mounted in a 'floating' bearing that accommodates both reciprocation and movement in a direction transverse to the reciprocation axis. A rocker arm is pivotally mounted intermediate its ends with one end engaging the floating bearing mount and the other end engageable with an axial-face cam portion of the rotatably driven gear. The rocker arm is effective to move the saw blade carrier in a direction transverse to the axis of reciprocation to provide the desired orbital action.

21 Claims, 11 Drawing Figures

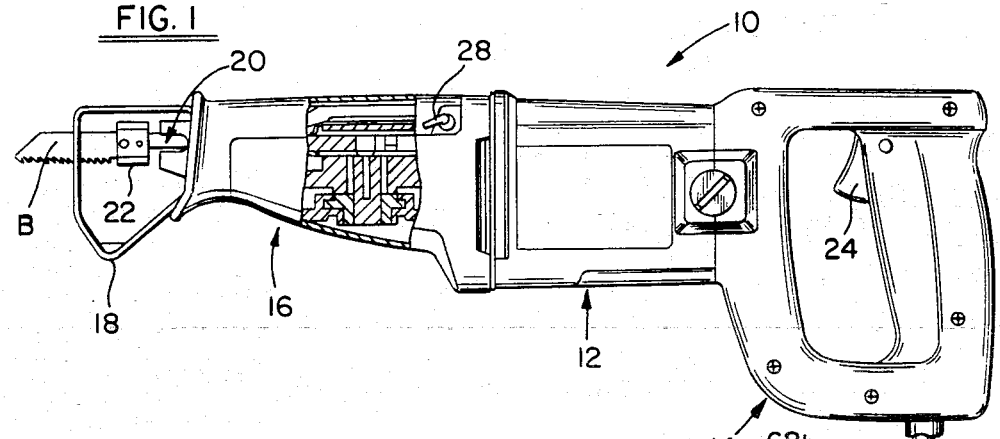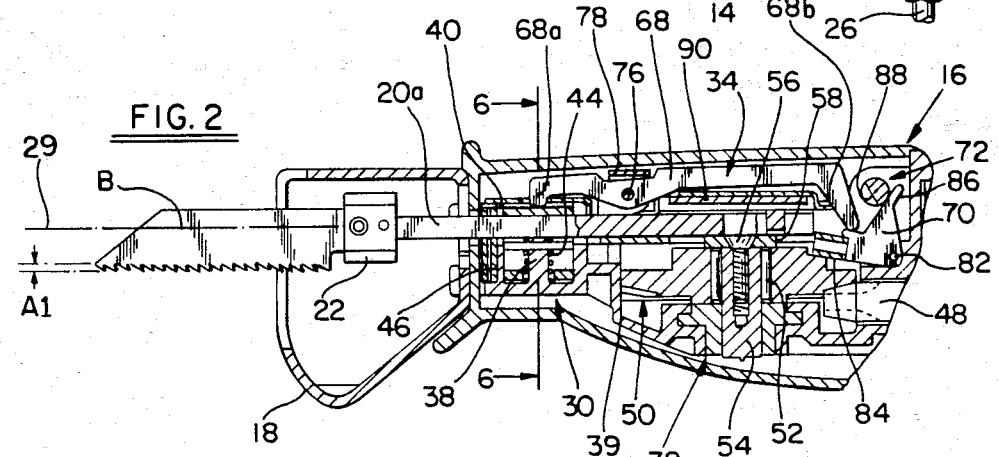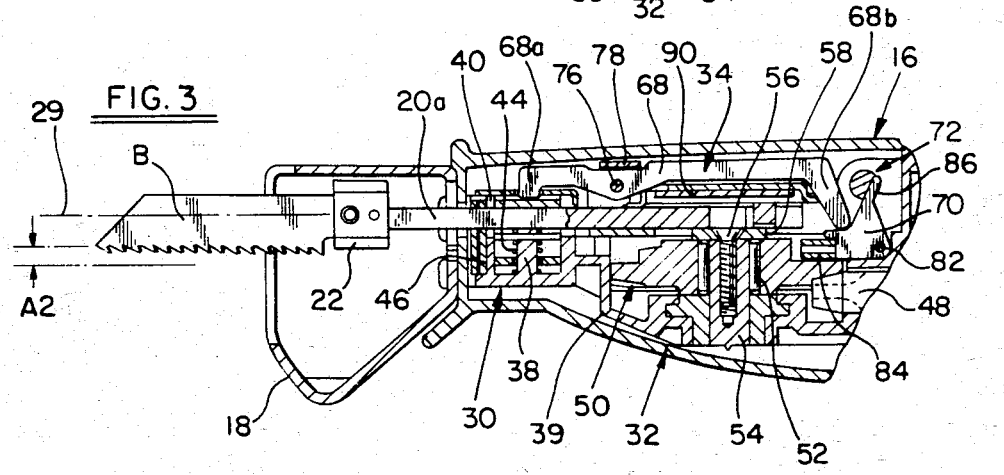

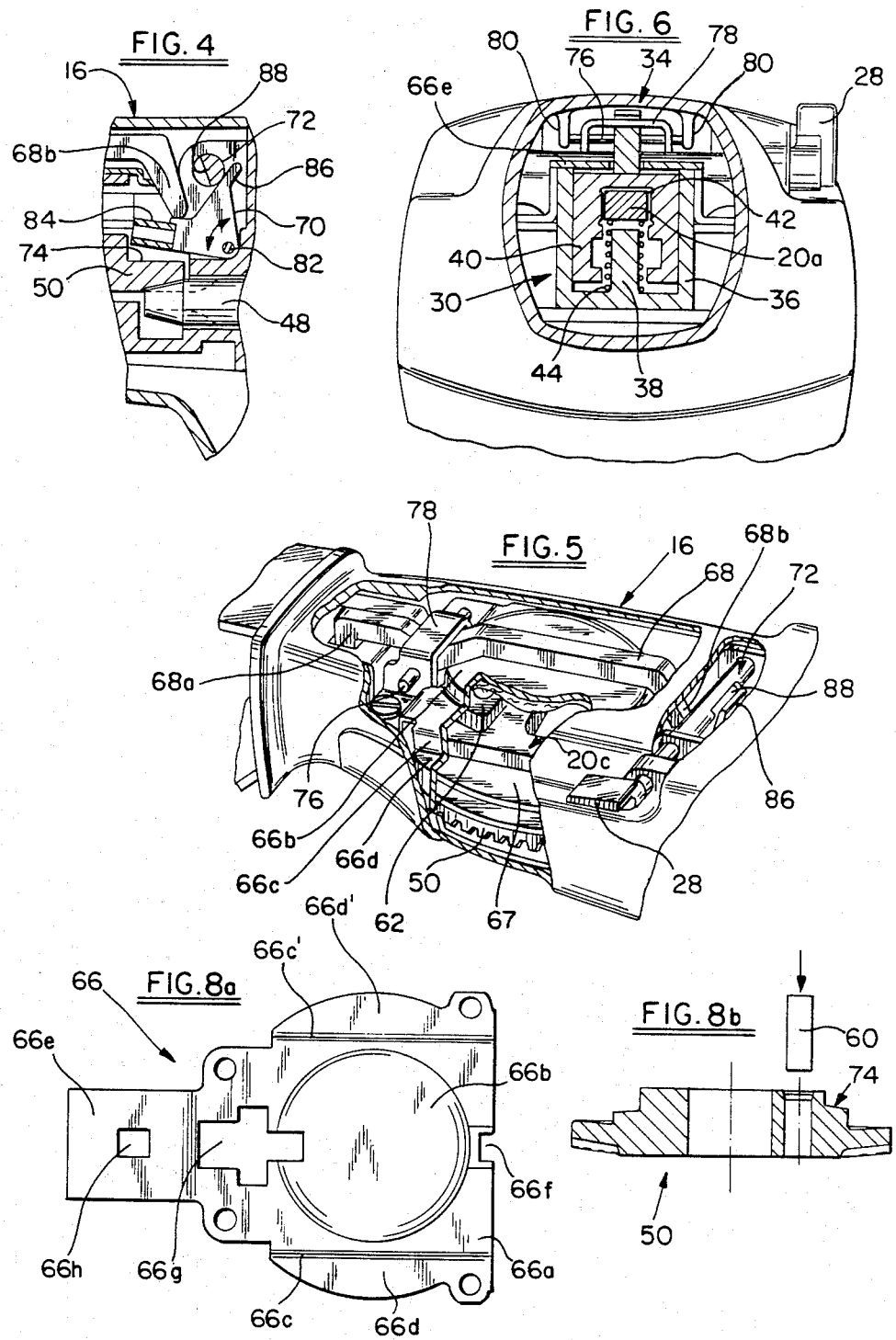

ORBITAL-ACTION RECIPROCATING POWER SAW

BACKGROUND OF THE INVENTION

The present invention relates to power saws and, more particularly, to orbital-action power saws that cause a saw blade to simultaneously reciprocate along an axis of reciprocation and move in a direction transverse to the axis of reciprocation.

Various mechanical components and component organizations have been developed for portable reciprocating power saws that cause the saw blade to reciprocate along an axis of reciprocation and move in a direction transverse to the axis of reciprocation to provide a more aggressive cutting action. It is generally considered desirable that the mechanical components and their organization in the power saw provide a relatively compact power transmission that causes a minimum of dynamic unbalance and has a relatively long service life. The requirement for a relatively compact transmission is particularly important with regard to in-line reciprocating power saws which typically have a handle at the rearward end that is gripped with one hand and a forward nose portion that is gripped with the other hand. The power transmitting components are usually contained within the nose portion of the tool, and, accordingly, must be relatively compact to allow convenient gripping of the tool. Prior art mechanisms have included various types of transmission arrangements, some of which have not permitted a sufficiently compact forward nose envelope for the tool or have had limited service life because of the type of power transmission components utilized within the tool. Other prior art mechanisms have utilized nutating or wobble plate type mechanisms that provide both the reciprocating and transverse motion but often times have had a limited range of adjustment for controlling the saw orbit and are relatively expensive to fabricate. Accordingly, a need exists for a reciprocating power saw of the orbital-action type in which the transmission components are sufficiently compact to provide an easily gripped forward nose portion, have a substantial service life, and limit the vibration produced during tool operation.

SUMMARY OF THE INVENTION

In view of the above, it is a primary object of the present invention, among others, to provide an orbital-action reciprocating power saw that is convenient to use and which has a long service life.

It is another object of the present invention to provide an orbital-action reciprocating power saw that has a comparatively compact forward nose portion that can be conveniently gripped to provide a saw that is well suited for manual manipulation.

It is still another object of the present invention to provide an orbital-action reciprocating power saw having an improved power transmission for driving a saw blade carrier with an orbital motion.

It is a further object of the present invention to provide an improved orbital-action reciprocating power saw in which the saw blade carrier is mounted in an improved bearing that accommodates both reciprocation and movement in a direction transverse to the axis of reciprocation.

It is still a further object of the present invention to provide an orbital-action reciprocating power saw having an improved rotary-to-reciprocation drive mechanism that provides improved service life.

In accordance with the above, an orbital-action reciprocating power saw includes a compound lever, motor-driven transmission that drives a saw blade carrier along an axis of reciprocation and simultaneously in a direction transverse to the axis of reciprocation to provide an aggressive cutting action. The saw blade carrier is mounted in a floating bearing that accommodates both the reciprocating movement of the saw blade carrier and movement in a direction transverse to the reciprocation axis. The transmission includes a rotary-to-reciprocation converting mechanism that converts the rotary motion of the drive motor into a reciprocating motion and a cam-driven pivotally mounted first lever or rocker arm that operates against the floating saw blade carrier bearing to cause the bearing and the supported saw blade carrier to move in a direction transverse to the axis of reciprocation. The rotary-to-reciprocation converting mechanism includes a pinion driven bevel gear with an eccentrically mounted pin that engages a slotted yoke portion of the saw blade carrier. The rocker arm is pivotally mounted intermediate its ends so that one end is engageable with a second lever, which is in turn engageable with an axial-face cam formed on the bevel gear; the other end is in contact with the floating bearing so that rotation of the bevel gear causes the saw blade carrier to reciprocate and the rocker arm to simultaneously move the floating bearing in a direction transverse to the reciprocation axis. In accordance with one feature of the invention, the pin eccentrically mounted on the bevel gear carries a slot-follower that provides for surface area contact between the follower and the slotted yoke to provide improved service life.

BRIEF DESCRIPTION OF THE DRAWINGS

FIG. 1 is a side view of an orbital-action reciprocating power saw in accordance with the present invention with selected portions broken away for reasons of clarity;

FIG. 2 is a side view, in cross section, of the forward portion of the power saw illustrated in FIG. 1 illustrating power transmission components in a first operative configuration;

FIG. 3 is a side view, similar to that of FIG. 2, showing the power transmission components in a second operative configuration;

FIG. 4 is a partial side view of a portion of the power transmission components of FIG. 2 and FIG. 3 showing an orbit adjusting component;

FIG. 5 is a partial perspective view of the transmission components of FIG. 2 and FIG. 3 with selected portions cut away for reasons of clarity;

FIG. 6 is an end cross sectional view, taken along line 6—6 of FIG. 2, showing a floating bearing mount;

FIG. 8a is a plan view of a cover plate utilized with the power transmission of FIG. 2 and FIG. 3;

FIG. 8b is a side view, in cross section, of a gear utilized with the power transmission of FIG. 2 and FIG. 3.

DESCRIPTION OF THE PREFERRED EMBODIMENT

Figure 7A:
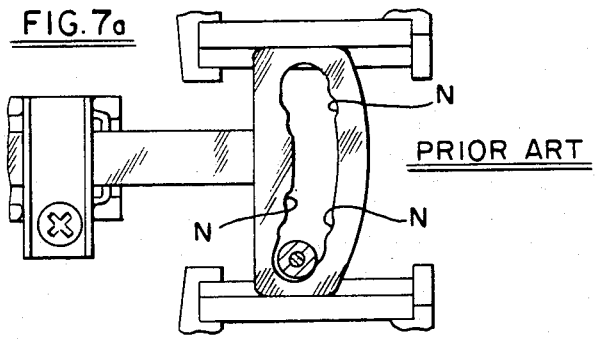
FIG. 7a is a plan view of a prior rotary-to-reciprocation mechanism.

An orbital-action reciprocating power saw in accordance with the present invention is illustrated in FIG. 1 and generally designated by the reference character 10. The power saw 10 includes a motor housing 12, a handle 14 connected to the rear portion of the motor housing, a transmission housing 16 mounted forwardly of the motor housing, and a work piece engaging shoe 18 mounted at the forward end of the transmission housing. A saw blade carrier means such as a saw blade carrier 20 extends forwardly from the transmission housing 16 and includes a saw blade clamp 22 for removeably attaching a saw blade B to the power saw. A trigger switch 24 is provided the in handle 14 for selectively applying electrical power provided through a line cord 26 to the power saw 10 motor (not shown). A user-adjustable cam lever 28 is provided on the transmission housing 16 to permit adjustment of the saw blade B orbit, as described more fully below.

As shown in FIG. 2 and FIG. 3, the saw blade B is designed to reciprocate in a plane that includes an axis of reciprocation 29 and, in addition, to move in a direction transverse to the axis of reciprocation to provide a combined orbital motion. The transverse motion is user-adjustable by adjustment of the cam lever 28, as described below, to provide a first, smaller orbital motion defined by the angular displacement A1 of FIG. 2 or a larger orbital motion defined by the angular displacement A2 of FIG. 3.

As shown generally in FIGS. 2, 3, 6, and 7b, the saw blade carrier 20 includes a forward carrier bar 20a and a rearward yoke 20b. The carrier bar 20a is mounted in a first bearing means or bearing assembly 30, described more fully below, and is caused to both reciprocate and move in a direction transverse to the axis of reciprocation to cause the blade B to have the desired orbital motion. The carrier bar 20 is caused to reciprocate by a reciprocating motion means such as a rotary-to-reciprocation converting mechanism, generally designated by the reference character 32, located below the saw blade carrier 20 and to the right of the bearing assembly 30. The controlled orbiting of the carrier 20 is provided by a compound-lever rocker arm assembly, generally designated by the reference character 34, with portions located located above the saw blade carrier 20.

As shown in FIGS. 2, 3, and 6, the bearing assembly 30 includes an insert receiving means such as a bearing block 36 and a vertically aligned elongated support post 38, to form a resilient biasing means both preferably formed integral with a cast metal gear case 39 mounted in the transmission housing 16. A slidable bearing insert 40 is received within the bearing block 36 and, as specifically shown in FIG. 6, includes a generally rectangular guideway 42 that provides bearing surfaces for engaging the top and sides of the carrier bar 20a. A helical coil spring 44, in compression, is mounted over the support post 38 and engages the underside of the carrier bar 20a and resiliently urges the carrier bar and the bearing insert 40 upwardly, away from the top of the support post 38. The bearing insert 40 and the bearing block 36 are dimensioned to provide a clearance space in the vertical direction to permit limited relative motion between the bearing insert 40 and its bearing block 36 in the vertical direction while the carrer bar 20a reciprocates to thereby accommodate the orbital motion. As shown in FIGS. 2 and 3, a dust seal 46 is mounted forwardly of the bearing assembly 30 and includes packing material in contact with the carrier bar 20a to prevent debris and other particulate contamination from entering the transmission housing 16.

A driving means for driving the rotary-to-reciprocation mechanism 32 and the compound-lever rocker arm assembly 34 includes a right-angle bevel gear set with a pinion gear 48 driven by an electric motor (not shown) within the motor housing 12, and a mating driven gear 50 that is journaled by a needle or sleeve bearing 52 about a bearing support post or spindle 54. The gear 50 and its bearing 52 are retained in position by a retaining screw 56 and washer 58. As can be appreciated, rotation of the pinion gear 48 causes the driven gear 50 to rotate about its axis. As shown in the detail of FIG. 8b, the driven gear 50, which is a rotatably driven member, is provided with an eccentrically mounted pin 60 that carries a rotatably mounted slot-follower 62, described in more detail below.

Figure 7B:
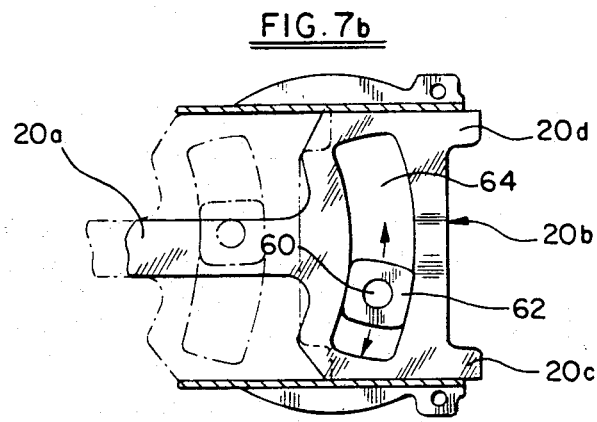
FIG. 7b is a plan view of an improved rotary-to-reciprocation mechanism in accordance with the present invention.

As shown in FIG. 7b, the yoke 20b is formed at the rearward end of the saw blade carrier 20 and includes a generally curvilinear slot 64. The lateral edges of the yoke 20b are constrained for reciprocating motion by the side walls of a second bearing means, or cover plate 66, partially illustrated in FIG. 7b and shown in plan view in FIG. 8a. The above-mentioned slot-follower 62 is rotatably mounted on the upper end of the eccentric pin 60 and positioned for sliding movement within the slot 64 of the yoke 20b. As shown by the directional movement arrows in FIG. 7b, rotation of the driven gear 50 causes the eccentrically mounted pin 60 and its slot-follower 62 to revolve about the axis of rotation of the gear 50 and cause the slot-follower 62 to oscillate in the yoke slot 64, in turn to cause the saw blade carrier bar 20 to reciprocate. As shown in FIG. 5, the yoke 20b slidably reciprocates upon a yoke plate 67, so that as illustrated in FIGS. 2 and 3, the yoke is compactly sandwiched between the cover plate 66 and yoke plate 67.

In prior rotary-to-reciprocation converting mechanisms, as exemplified by the structure of FIG. 7a, a circular slot-follower is typically mounted in the yoke slot and used to drive the yoke. In this prior arrangement, the surface contact established between the circular slot-follower and the surfaces of the yoke slot is defined by a line of contact generally parallel to the axis of the circular slot-follower. In this type of arrangement, substantial local compressive stresses can develop at discrete points along the line of contact. In time, the contacting surfaces are subject to fatigue failure and wear notches N of the type shown in FIG. 7a can develop. Also, the notches N can be caused by bearing loads, as well as changes in direction of bearing rotation.

In contrast to the prior designs, the present invention provides a non-circular slot-follower 62 that provides substantial contact areas with the slot 64. The slot-follower 62 includes bearing surfaces having a radius of curvature generally coincident with that of the curvilinear side walls of the slot 64 to provide sliding contact between the two. The same concept is applicable should the slot 64 be rectilinear, instead, or should the slot be formed in any suitable geometric configuration; in such events the configuration of the slot-follower 62 will be selected to match that of the slot to provide the necessary surface area contact. As can be appreciated, the contact surface area is substantially increased to alleviate wear problems experienced with the prior designs. In addition, the present invention provides for rearwardly extending 'wings' 20c and 20d on the opposite lateral sides of the yoke 20b to provide a wide contact area between the yoke 20b and the restraining bearing surfaces provided by the cover plate 66.

The orbital motion of the saw blade B is obtained through the above-mentioned compound-lever rocker assembly 34 that is mounted generally above the saw blade carrier bar 20. The rocker assembly 34 includes a transverse motion means such as a first lever or rocker arm 68, and further includes a second lever or orbit lifter 70, an excursion-limit control means such as a third-turn cam pin 72, and an axial-face cam surface 74 integrally formed on the upper surface of the gear 50. The orbit lifter 70 and the axial-face cam surface 74 of gear 50 form a part of the driving means and provide driving motion for the rocker arm 68.

Figure 9:
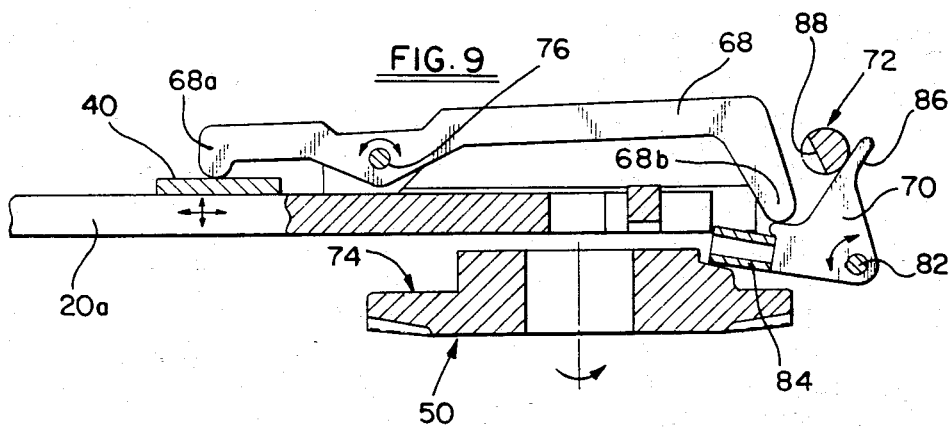
FIG. 9 is a side view of the power transmission components of FIG. 2 and FIG. 3.

The rocker arm 68, as shown in FIGS. 2, 3, 5, and 9, is pivotally mounted by a pivot pin 76 that extends through an appropriately sized clearance bore in the rocker arm and is carried in a retaining bracket 78. As shown in FIG. 6, two ribs 80 in the transmission housing 16 trap opposite ends of the pin 76 to retain the pin in place. The portion of the rocker arm 68 forward of the retaining bracket 78 includes a downwardly extending portion 68a which engages the top surface of the bearing insert 40 of the bearing assembly 30. The rearward end of the rocker arm 68 includes a similarly downward extending portion 68b. The orbit lifter 70, as shown in detail in FIGS. 4 and 9, is mounted for limited pivotal motion on a pin 82 and includes a rotatably mounted roller 84 for engagement with the below-described cam surface 74, and a tab 86 that engages the third-turn adjustment cam pin 72. The rearward end 68b of the rocker arm 68 engages the orbit lifter 70 adjacent the cam following roller 84.

As shown in FIGS. 4 and 5, the third-turn cam pin 72 is defined by a generally cylindrical rod with one end extending through the transmission housing 16 with the user-adjustable cam lever 28 secured thereto. The third-turn cam pin 72 has a flat 88 formed in its central area along a chordal line as shown in FIG. 4. Adjustment of the third-turn cam pin 72 to the position shown in FIGS. 2 and 4, that is, with a first surface profile such as the full circumferential surface of the cam pin engaging the tab 86 of the orbit lifter 70, limits counter-clockwise pivotal motion of the orbit lifter to a first excursion limit and, conversely, adjustment of the third-turn cam pin 72 to the position shown in FIG. 3, that is, with a second surface profile such as the flat 88 of the cam pin engaging the tab 86 of the orbit lifter, allows a greater counter-clockwise excursion of the orbit lifter to a second excursion limit.

The axial-face cam surface 74 formed on the backside of the gear 50 is defined by a generally circular track with a rising and declining profile. The cam following roller 84 of the orbit lifter 70 is permitted to engage the cam track as the profile of the axial-face cam 74 rises and pivot clockwise to lift the rearward end of the rocker arm 68 and cause the forward end of the rocker arm to depress the bearing block 40 downwardly. Conversely, the orbit lifter 70 pivots counterclockwise on the declining portion of the cam track to allow the spring 44 (FIG. 6) to move the blade carrier 20a upwardly while the tool is idling. While cutting, however, the forces against the blade when it engages the work surface are the primary forces which move the blade carrier upwardly. As can be appreciated, the downward and return upward movement of the bearing block 40 and the journalled saw blade carrier 20 causes the desired orbital motion of the saw blade B.

When the third-turn cam pin 72 is adjusted so that the flat 88 engages the tab 86 of the orbit lifter 70, the orbit lifter can pivot so that the roller 84 follows the entire rising and declining portions of the cam track to cause the maximum orbit motion A2, as illustrated in FIG. 3. Conversely, when the third-turn cam pin 72 is adjusted so that the circumferential surface of the cam pin engages the orbit lifter tab 86, the maximum counter-clockwise excursion of the orbit lifter 70 is limited so that the roller 84 can only follow the higher portions of the cam track to thus limit the orbital motion to a minimum (A1) as illustrated in FIG. 2. In the latter event, the cam track 74 is engaged during approximately 45° of its rotation. In either case, the roller 84 always engages at least a portion of the cam track 74 during each rotation of the driven gear 50 to provide the desired user-adjustable orbital motion.

The above-described transmission components are assembled in the transmission housing 16 using the multifunction cover plate 66 (FIG. 8a) and yoke plate 67 of (FIG. 5). As shown therein, and in FIG. 5, the cover plate 66, which may be pressed or stamped as a one-piece unit from sheet stock, includes a upper wall 66a having a domed portion 66b, sidewalls 66c and 66c', outwardly extending flanges 66d and 66d', and a forwardly extending portion 66e. The interior surface of the sidewalls 66c and 66c' along with the upper wall 66a define bearing surfaces for capturing the yoke portion 20b of the saw blade carrier bar 20 while the dome 66b accommodates motion of the slot-follower 62 in the slot 64. Aperture means, including three cut-outs 66f, 66g, and 66h, are provided in the cover 66 to provide openings to accommodate the rearward, intermediate, and forward ends of the rocker arm 68, respectively.

The cover plate 66 serves to structurally integrate the transmission components. As mentioned above, the cover plate 66 provides bearing surfaces for guiding the yoke 20b. In addition, the forward end 66e of the cover plate 66 overlies the bearing block 36 to capture the bearing insert 40. As shown in FIG. 5, means for providing lubricant to the slot follower 62 and yoke 20b include an oil-soaked felt or similar material pad 90 secured to the interior of the dome 66b.

The organization of the power transmission components is relatively space-efficient since the rotary-to-reciprocation converting mechanism is located on one side of the saw blade carrier bar and the orbit controlling rocker arm assembly is located on the other side of the saw blade carrier bar. This organization allows for a relatively compact forward nose portion as compared to prior designs in which the rotary-to-reciprocation and orbit controlling mechanism are both located on the same side of the saw blade carrier bar.

Thus it will be appreciated from the above that as orbital-action reciprocating power saw is provided by which the principal objective, among others, is completely fulfilled. It will be equally apparent and is contemplated that modification and/or changes may be made in the illustrated embodiment without departure from the invention. Accordingly, it is expressly intended that the foregoing discription and accompanying drawings are illustrative of preferred embodiments only, not limiting, and that the true spirit and scope of the present invention will be determined by reference to the appended claims and their legal equivalent.

What is claimed is:

1. An orbital-action reciprocating power saw, comprising:
   a housing;
   saw blade carrier means having at least an internal portion located within the housing for supporting a saw blade outside of the housing;
   reciprocating motion means located within the housing on one side of the internal portion of the saw blade carrier means for transmitting reciprocating motion to the carrier means within the housing;
   transverse motion means located within the housing on the other side of the internal portion of the saw blade carrier means for transmitting motion to the carrier means within the housing in a direction transverse to the axis of reciprocation of the saw blade carrier means; and
   driving means located on the one side of the saw blade carrier means for providing driving motion to the reciprocating motion means and the transverse motion means so that the saw blade carrier means moves in a composite orbital path.

2. The orbital-action reciprocating power saw recited in claim 1, wherein the reciprocating motion means comprises:
   a rotatably driven member having a pin mounted eccentrically thereon, said saw blade carrier means having a yoke with a slot formed therein, said pin disposed within the slot, rotation of said rotatably driven member causing said saw blade carrier means to reciprocate.

3. The orbital-action reciprocating power saw recited in claim 2, wherein the reciprocating motion means further comprises:
   a slot-follower rotatably mounted on said pin and having opposite sides thereof in surface area contact with corresponding surface area portions of the slot.

4. The orbital-action power saw recited in claim 3, wherein the yoke of said saw blade carrier blade means includes curvilinear surface portions defining the slot and said slot-follower includes complementary curvilinear surfaces thereon for effecting sliding engagement with the curvilinear surface portions defining the slot.

5. The orbital-action reciprocating saw recited in claim 1, wherein the transverse motion means comprises:
   a rocker arm pivotally mounted intermediate its ends and having one end for moving said saw blade carrier means in a direction transverse to the axis of reciprocation and the other end movable by the driving means for periodically moving said saw blade carrier means in a direction transverse to the axis of reciprocation.

6. The orbital-action reciprocating power saw recited in claim 5, wherein the driving means comprises:
   a rotatably driven member having a cam surface with rising and declining profile portion for facilitating movement of the other end of said rocker arm.

7. The orbital-action reciprocating power saw recited in claim 5, which further comprises a housing and wherein said rocker arm pivots about a pin having two ends connected in said housing, and further comprising ribs formed in said housing adjacent said pin ends to trap said pin in place.

8. The orbital-action reciprocating power saw recited in claim 1, further comprising:
   bearing means for mounting the saw blade carrier means to accommodate reciprocating movement thereof along an axis of reciprocation and movement in a direction transverse to the axis of reciprocation.

9. The orbital-action reciprocating power saw recited in claim 8 wherein the transverse motion means comprises:
   a rocker arm pivotally mounted intermediate its ends and having one end positioned to engage the bearing means to impart transverse motion to the saw blade carrier means.

10. The orbital-action reciprocating power saw recited in claim 2, further comprising:
    bearing means for constraining lateral sides of the yoke of the saw blade carrier means to permit reciprocating movement and preclude lateral movement of the saw blade carrier means.

11. The orbital-action reciprocating power saw recited in claim 8, wherein said bearing means comprises:
    a bearing insert having a passage therein through which a portion of the saw blade carrier means passes in sliding engagement therewith; and
    insert receiving means for receiving said bearing insert and dimensioned to permit said bearing insert to move relative to said receiving means in a direction transverse to the axis of reciprocation.

12. The orbital-action reciprocating power saw recited in claim 11, further comprising:
    resilient biasing means interposed between said bearing insert receiving means and said saw blade carrier means to resiliently urge said saw blade carrier means in a first direction.

13. The orbital-action reciprocating power saw recited in claim 12, wherein said resilient biasing means comprises an elongated post associated with said insert receiving means and having an end spaced from said saw blade carrier means and a spring, in compression, mounted on said post in engagement with said saw blade carrier means to resiliently urge said saw blade carrier means away from said end of said post.

14. The orbital-action reciprocating power saw recited in claim 10, wherein:
    said saw blade carrier means includes an end;
    said yoke is formed at said end;
    said bearing means includes two sidewalls, each of which engages a respective lateral side of the yoke; and
    each lateral side of the yoke includes a rearwardly extending wing engageable with a respective sidewall.

15. An orbital-action reciprocating power saw comprising:
    a housing;
    saw blade carrier means for supporting a saw blade external of the housing at one end thereof and having an internal portion located within the housing and including a yoke formed therein at the other end thereof;
    first bearing means for mounting the saw blade carrier means intermediate the ends thereof to accommodate reciprocating movement thereof along an axis of reciprocation and movement in a direction transverse to the axis of reciprocation;
    second bearing means for constraining lateral sides of the yoke of the saw blade carrier means to permit reciprocating and preclude lateral movement of the saw blade carrier means;

reciprocating motion means located within the housing on one side of the internal portion of the saw blade carrier means for transmitting reciprocating motion to the carrier means;

transverse motion means located within the housing on the other side of the internal portion of the saw blade carrier means for transmitting motion to the carrier means in a direction transverse to the axis of reciprocation of the saw blade carrier means; and driving means located on the one side of the saw blade carrier means for providing driving motion to the reciprocating motion means and the transverse motion means so that the saw blade carrier means moves in a composite orbital path.

16. An orbital-action reciprocating power saw, comprising:

saw blade carrier means for supporting a saw blade;

reciprocating motion means located on one side of the saw blade carrier means for transmitting reciprocating motion to the carrier means;

transverse motion means located on the other side of the saw blade carrier means for transmitting motion to the carrier means in a direction transverse to the axis of reciprocation of the saw blade carrier means wherein the transverse motion means comprises a rocker arm pivotally mounted intermediate its ends and having one end for moving said saw blade carrier means;

driving means for providing driving motion to the reciprocating motion means and the transverse motion means so that the saw blade carrier means moves in a composite orbital path wherein the driving means comprises a rotatably driven member having an axial-face cam surface with rising and declining profile portion for facilitating movement of the other end of said rocker arm.

17. The orbital-action reciprocating power saw recited in claim 16, further comprising:

a pivotally mounted cam following lever interposed between said axial-face cam surface and said other end of said rocker arm.

18. The orbital-action reciprocating power saw recited in claim 17, further comprising:

means for controlling said pivotally mounted cam following lever to limit the pivotal excursion thereof.

19. The orbital-action power saw recited in claim 18, wherein said means for controlling comprises a rotatably mounted cam pin defined by at least two surface profiles for defining two excursion limits of said pivotally mounted cam follower.

20. An orbital-action reciprocating power saw, comprising:

saw blade carrier means for supporting a saw blade and including a yoke with a slot formed therein;

reciprocating motion means located on one side of the saw blade carrier means for transmitting reciprocating motion to the carrier means wherein the reciprocating motion means includes a rotatably driven member having a pin mounted eccentrically thereon and disposed within the slot of the yoke, rotation of the rotatably driven member causing the saw blade carrier means to reciprocate;

transverse motion means located on the other side of the saw blade carrier means for transmitting motion to the carrier means in a direction transverse to the axis of reciprocation of the saw blade carrier means;

driving means for providing driving motion to the reciprocating motion means and the transverse motion means so that the saw blade carrier means moves in a composite orbital path; and bearing means for constraining lateral sides of the yoke of the saw blade carrier means to permit reciprocating movement and preclude lateral movement of the saw blade carrier means wherein the bearing means includes a cover plate having an upper wall defining a domed portion overlying the pin, and a pair of sidewalls in bearing engagement with respective lateral sides of the yoke.

21. The orbital-action reciprocating power saw recited in claim 20, further comprising means for providing lubricant to said slot-follower and yoke.

* * * * *